June 29, 1948.  H. H. McCARL  2,444,056

SWINGING LOOP HANDLE CONSTRUCTION

Filed July 19, 1945

INVENTOR.
Howard Hinds McCarl
BY
William F. Diamond
ATTORNEY

Patented June 29, 1948

2,444,056

UNITED STATES PATENT OFFICE 2,444,056

SWINGING LOOP HANDLE CONSTRUCTION

Howard Hinds McCarl, Washington, D. C.

Application July 19, 1945, Serial No. 606,015

2 Claims. (Cl. 16—126)

(Granted under the act of March 3, 1883, as amended April 30, 1928; 370 O. G. 757)

The invention described herein, if patented may be manufactured and used by or for the Government for governmental purposes, without the payment to me of any royalty thereon.

This invention relates generally to a handle construction and has particular relation to handles for receptacles, chests, pans, or the like.

An object of this invention is to provide an improved handle construction having means to prevent the handle from swinging to a position above the horizontal and means to prevent outward displacement of the handle arms while in horizontal position.

A further object of this invention is to provide an improved swinging handle in the form of a bail whose free ends are supported in a keeper attached to a receptacle, the keeper having abutment means to limit the upward swinging movement of the handle and said abutment means also being adapted to prevent endwise displacement of the free ends of the bail.

Other objects and advantages of the present invention will appear in the following detailed description and be particularly pointed out in the appended claims, reference being had to the accompanying drawing forming part of this specification, and in which:

Figure 1:
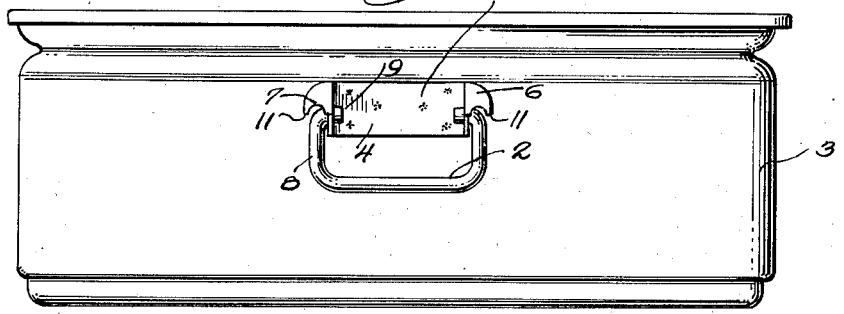
Figure 1 is an elevational view of a receptacle showing the handle construction of this invention applied thereto.
Figure 2:
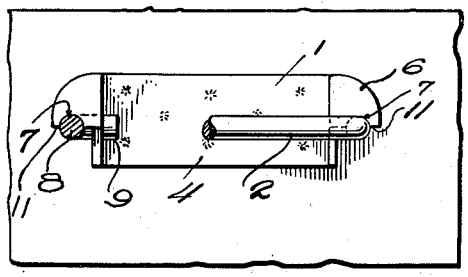
Figure 2 is a front elevational view of the handle construction showing the handle in raised position, with part of the handle cut away to clearly show the construction.
Figure 4:
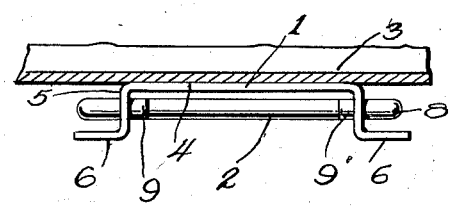
Figure 4 is a plan view.
Figure 3:
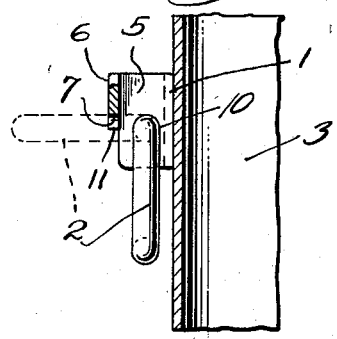
Figure 3 is a side elevational view showing the handle in a freely hanging vertical position.
Figure 5:
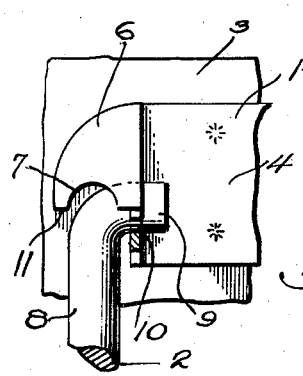
Figure 5 is an enlarged detail showing the semicircular stop.

The specific receptacle shown in Figure 1 is the subject matter of an application, Ser. No. 606,-016, filed July 19, 1945.

Referring to the drawing in greater detail, the handle construction comprises a keeper 1 and a handle or bail 2. The keeper is made of metal or other suitable material and is suitably fastened by spot welding or by other means to the receptacle 3, as shown in Figure 1. Normally the handle construction is applied to opposite ends of the receptacle.

The keeper is comprised of a body portion 4, upstanding portions 5 extending from the body portion and at right angles thereto, and abutments 6 extending from the upstanding portions and at right angles thereto. Each abutment 6 has a semi-circular cut out 7.

The handle or bail 2 is circular in cross section, is made of metal or other suitable material, and has arms 8 having the free ends 9 thereof inwardly bent to form fingers for insertion in circular openings 10 extending through the upstanding portions 5 of the keeper 1.

In operation, when the handle 2 is grasped for lifting the receptacle, the handle will first swing upwardly until the handle arms 8 are received in the cut outs 7 which will act as stops to limit upward movement of the handle arms to substantially a horizontal position. Then while the handle arms 8 cooperate with the stops 7, the receptacle can be lifted.

It is to be noted that the radius of curvature of the cut outs 7 is substantially equal to the radius of curvature of the handle arms 8 to provide for a close surface contact of the parts when the arms 8 are in the raised position to prevent free play of the arms and to insure the arms being rigidly held in position. Thus the cut outs or stops 7 not only limit upward movement of the arms 8 but also limit sidewise movement of the handle arms when in raised position. Thus it is evident that the portions 11 of the stops 7 prevent outward displacement of the arms 8. This feature is particularly important in the handle construction disclosed herein in which the fingers 9 of the handle arms are merely inserted in openings or apertures 10 with no means to prevent outward displacement of the fingers out of the openings other than the rigidity of the material of which the handle is constructed. In the construction of this invention the extensions 11 also serve to prevent endwise outward displacement of fingers 9 during load conditions when a strain is put on handle arms 8 and abutments 6. Thus positive means are provided to prevent the free ends 9 from slipping out of their sockets.

While the invention has been described in more or less detail, it is not to be limited thereby, as changes may be made in the form, arrangement and construction of parts, and equivalents may be substituted, without departing from the spirit and scope of the invention, the form hereinbefore described being merely a preferred embodiment thereof.

What I claim is:

1. A handle construction comprising a one-piece keeper and a permanently attached handle, said keeper being adapted to be fastened to a receptacle and comprising a flat substantially oblong body portion, upstanding end portions bent up from the extreme ends of the body portion and coextensive with the width of the body portion, and extending at right angles thereto, abutments formed on the outer ends of said upstanding portions and extending at an angle thereto, said abutments provided with substantially semi-circular cut-outs, said upstanding portions provided with apertures, the handle being in bail form with side arms terminating in fingers positioned in said apertures, the side arms of the handle being formed of material of circular cross section and adapted to engage the semi-circular cut-outs when in operative position, whereby when the handle is raised the abutments act to limit the upward movement of the handle and prevent lateral displacement of the fingers from the apertures.

2. A handle construction comprising a one-piece keeper and a permanently attached handle, said keeper adapted to be fastened to a receptacle and comprising a flat substantially oblong body portion, upstanding end portions bent up from the extreme ends of the body portion and coextensive with the width of the body portion, and extending at right angles thereto, outwardly directed extensions on the ends of the upstanding end portions located in a plane parallel to the body portion and providing abutments, said lateral extensions provided with substantially semi-circular cut-outs, said upstanding portions provided with apertures, the handle being in bail form with side arms terminating in inwardly directed fingers positioned in said apertures, the side arms of the handle being formed of material of circular cross section and adapted to engage the semi-circular cut-outs when in operative position, whereby when the handle is raised the abutments act to limit the upward movement of the handle and prevent lateral displacement of the fingers from the apertures.

HOWARD HINDS McCARL.

REFERENCES CITED

The following references are of record in the file of this patent:

UNITED STATES PATENTS

| Number | Name | Date |
|---|---|---|
| 209,889 | Harper | Nov. 12, 1878 |
| 215,739 | Hart | May 27, 1879 |
| 1,094,820 | Sargent | Apr. 28, 1914 |

FOREIGN PATENTS

| Number | Country | Date |
|---|---|---|
| 9,790 | Great Britain | July 29, 1886 |
| 579,408 | France | Oct. 1, 1924 |
| 335,701 | France | Dec. 11, 1903 |